US012064887B2

(12) United States Patent
Iaccarino

(10) Patent No.: US 12,064,887 B2
(45) Date of Patent: Aug. 20, 2024

(54) COMB FOR A HAIR CUTTING APPLIANCE

(71) Applicant: KONINKLIJKE PHILIPS N.V., Eindhoven (NL)

(72) Inventor: Luca Iaccarino, Groningen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 28 days.

(21) Appl. No.: 16/969,577

(22) PCT Filed: Feb. 20, 2019

(86) PCT No.: PCT/EP2019/054200
§ 371 (c)(1),
(2) Date: Aug. 13, 2020

(87) PCT Pub. No.: WO2019/162318
PCT Pub. Date: Aug. 29, 2019

(65) Prior Publication Data
US 2021/0008739 A1 Jan. 14, 2021

(30) Foreign Application Priority Data
Feb. 20, 2018 (EP) .................................... 18157663

(51) Int. Cl.
*B26B 19/20* (2006.01)
*B26B 19/38* (2006.01)

(52) U.S. Cl.
CPC .......... *B26B 19/20* (2013.01); *B26B 19/3813* (2013.01)

(58) Field of Classification Search
CPC ........ A45D 24/00; A45D 24/46; B26B 19/06; B26B 19/063; B26B 19/20; B26B 19/38;
(Continued)

(56) References Cited

U.S. PATENT DOCUMENTS 1,932,876 A * 10/1933 Agostini ............... B26B 21/125 30/30
2,618,060 A * 11/1952 Giorgi ..................... B26B 19/20 30/201

(Continued)

FOREIGN PATENT DOCUMENTS

EP 2105267 9/2009
JP S49123080 U 10/1974

(Continued)

OTHER PUBLICATIONS https://www.merriam-webster.com/dictionary/part Definition of the word Part (noun).*

(Continued)

*Primary Examiner* — Richard D Crosby, Jr.

(57) ABSTRACT

A comb for a hair cutting appliance having a cutting direction is provided. The comb has a comb connection part that connects a first comb part and a second comb part. The first comb part has a plurality of first comb teeth, the comb teeth being arranged to guide hair toward the hair cutting appliance for cutting hair. The second comb part has a plurality of second comb teeth aligned with the first comb teeth. The first and second comb teeth are connected together by connection comb teeth. The first comb teeth and the second comb teeth are at least partially formed from a plastics material and the connection comb teeth are at least partially formed from metal. During use of the comb, the first comb teeth precede the connection comb teeth and the second comb teeth trail the connection comb teeth when viewed in the cutting direction.

8 Claims, 3 Drawing Sheets

(58) Field of Classification Search
CPC ............ B26B 19/3806; B26B 19/3813; B26B 19/00–48
USPC ................................ 30/194–202, 233–233.5
See application file for complete search history.

(56) References Cited

U.S. PATENT DOCUMENTS

| | | | | |
|---|---|---|---|---|
| 3,279,061 | A * | 10/1966 | Andis | B26B 19/3846 30/200 |
| 4,563,814 | A * | 1/1986 | Trichell | B26B 19/44 30/223 |
| 4,671,303 | A * | 6/1987 | Saferstein | A45D 24/30 119/625 |
| 5,050,305 | A * | 9/1991 | Baker | B26B 19/20 30/201 |
| 6,079,103 | A * | 6/2000 | Melton | B26B 19/20 30/43.92 |
| 6,279,234 | B1 * | 8/2001 | Chaouachi | B26B 19/20 30/200 |
| 6,889,437 | B2 | 5/2005 | Bader | |
| 7,073,262 | B2 * | 7/2006 | Melton | B26B 19/20 30/200 |
| 9,434,078 | B2 * | 9/2016 | Julemont | B26B 19/20 |
| 9,987,759 | B2 | 6/2018 | Molema et al. | |
| 10,011,029 | B2 * | 7/2018 | Bellisario | B26B 19/3893 |
| 10,124,496 | B2 * | 11/2018 | Nab | B26B 19/3813 |
| 10,293,500 | B1 * | 5/2019 | Baker | B26B 19/20 |
| 10,377,049 | B2 * | 8/2019 | Whittaker | B26B 19/20 |
| 10,456,936 | B2 * | 10/2019 | Darwinkel | B26B 19/388 |
| 10,730,197 | B2 * | 8/2020 | Iaccarino | B26B 19/20 |
| 10,786,914 | B2 * | 9/2020 | Galanis | B26B 21/4006 |
| 10,913,170 | B2 * | 2/2021 | Phoon | B26B 19/3813 |
| 10,946,537 | B2 * | 3/2021 | Danmola | B26B 19/20 |
| D928,405 | S * | 8/2021 | Huang | D28/53 |
| D931,538 | S * | 9/2021 | Marquez | D28/53 |
| 11,230,022 | B2 * | 1/2022 | Halmut | B26B 19/20 |
| 11,400,610 | B2 * | 8/2022 | Moustakas | B26B 21/42 |
| 11,420,349 | B2 * | 8/2022 | Iaccarino | B26B 19/20 |
| 2001/0004896 | A1 | 6/2001 | Chaouachi | |
| 2004/0250429 | A1 * | 12/2004 | McCambridge | B26B 19/20 30/233.5 |
| 2005/0138817 | A1 * | 6/2005 | Yamaguchi | B26B 19/20 30/233 |
| 2008/0005908 | A1 * | 1/2008 | Melton | B26B 19/20 30/233.5 |
| 2008/0184565 | A1 * | 8/2008 | Zoot | B26B 19/3813 30/196 |
| 2008/0289192 | A1 * | 11/2008 | Martelli | B26B 19/3813 30/233.5 |
| 2009/0113722 | A1 * | 5/2009 | Werner | B26B 19/3813 30/200 |
| 2010/0024615 | A1 * | 2/2010 | Rebaudieres | B26B 21/405 83/14 |
| 2011/0061243 | A1 * | 3/2011 | Smit | B26B 19/20 30/233.5 |
| 2014/0102271 | A1 * | 4/2014 | Krenik | B26B 19/3846 83/13 |
| 2017/0266823 | A1 * | 9/2017 | Whittaker | B26B 19/20 |
| 2017/0305020 | A1 * | 10/2017 | Darwinkel | B26B 19/3886 |
| 2017/0341245 | A1 * | 11/2017 | Nayna | B26B 19/284 |
| 2018/0222068 | A1 * | 8/2018 | Halmut | B26B 19/44 |
| 2019/0009418 | A1 * | 1/2019 | Baltussen | B26B 19/20 |
| 2020/0094425 | A1 * | 3/2020 | Iaccarino | B26B 19/20 |
| 2020/0130205 | A1 * | 4/2020 | Iaccarino | B26B 19/386 |
| 2020/0230832 | A1 * | 7/2020 | Danmola | B26B 19/20 |
| 2021/0122070 | A1 * | 4/2021 | Iaccarino | B26B 19/20 |
| 2021/0129362 | A1 * | 5/2021 | Phoon | B26B 19/20 |

FOREIGN PATENT DOCUMENTS

| | | | |
|---|---|---|---|
| JP | 2003181166 | A | 7/2003 |
| JP | 2005270193 | A | 10/2005 |
| JP | 2008212713 | A | 9/2008 |
| WO | 2007/132385 | | 11/2007 |
| WO | 2011075505 | | 6/2011 |
| WO | 2015/028330 | | 3/2015 |
| WO | 2017021202 | | 2/2017 |

OTHER PUBLICATIONS

International Search Report and Written Opinion Dated May 14, 2019 for International Application No. PCT/EP2019/054200 Filed Feb. 20, 2019.

* cited by examiner

COMB FOR A HAIR CUTTING APPLIANCE

CROSS REFERENCE TO RELATED APPLICATIONS

This application is the U.S. National Phase application under 35 U.S.C. § 371 of International Application No. PCT/EP2019/054200 filed Feb. 20, 2019, published as WO 2019/162318 on Aug. 29, 2019, which claims the benefit of European Patent Application Number 18157663.8 filed Feb. 20, 2018. These applications are hereby incorporated by reference herein.

TECHNICAL FIELD

The present disclosure relates to a comb for a hair cutting appliance.

BACKGROUND

Hair cutting systems, e.g. for cutting hair and/or facial hair, often comprise a hair cutting appliance including one or more cutting blades for cutting the hair and a comb for guiding the hair towards the blades of the cutting appliance to be cut. The comb may be couplable to or integral with the hair cutting appliance.

The comb includes a comb surface for resting against a user's skin whilst hair is being cut. Cutting blades of the hair cutting appliance are aligned with part of the comb surface, e.g. in a direction of cutting, and the length to which hair is cut by the hair cutting system can be set by adjusting the distance between the cutting blades and the comb surface in a direction perpendicular to the direction of cutting.

In order to adjust the offset between the cutting blades and the comb surface, the comb may be interchangeable. For example, a first comb, which provides the comb surface at a first distance from the position of the cutting blades, may be changed for a second comb providing the comb surface at a greater distance from the position of the cutting blades.

Alternatively, the hair cutting appliance or the comb may include an adjustment mechanism for adjusting the offset between the cutting blades and the comb surface, e.g. without changing the comb.

STATEMENTS OF INVENTION

The invention is defined by the claims.

According to an aspect of the present disclosure, there is provided a hair cutting system comprising a hair cutting appliance and a comb couplable to the hair cutting appliance, wherein the comb comprises a plurality of comb teeth arranged to guide hair towards the hair cutting apparatus, wherein the comb teeth are at least partially formed from a plastics material, and wherein a portion of the comb aligned with the cutting blade of the hair cutting apparatus, e.g. in a cutting direction of the hair cutting apparatus, is formed from metal.

According to another aspect of the present disclosure, there is provided a comb for a hair cutting appliance, comprising a first comb part comprising a plurality of first comb teeth, the first comb teeth being arranged, during use, to guide hair towards the hair cutting appliance for cutting, a second comb part comprising a plurality of second comb teeth aligned with the first comb teeth, and a comb connection part comprising a plurality of connection comb teeth aligned with the first comb teeth, the first and second comb teeth are connected together by the connection comb teeth, the first comb teeth and the second comb teeth are at least partially formed from a plastics material, and the connection comb teeth are at least partially formed from metal. During use of the comb, the first comb teeth precede the connection comb teeth and the second comb teeth trail the connection comb teeth when viewed in the cutting direction.

The second comb teeth define a skin contact surface. The second comb teeth are, when the comb is in use, located behind the cutting location formed by the cutting blades. As is generally known in the field of electric clippers two teethed blades, which during use reciprocate with respect to each other, cooperate to cut hairs between the teeth of the blades. The cutting location is the area where hairs might be cut by the cooperating blades during use of the electric clipper.

According to another aspect of the present disclosure, there is provided a comb for a hair cutting appliance, wherein the comb comprises a first comb part comprising a plurality of first comb teeth, the first comb teeth being arranged to guide hair towards the hair cutting appliance for cutting, and a second comb part may comprise a coupling portion for coupling the comb to the hair cutting appliance, wherein the first comb part and second comb part are at least partially formed from a plastics material and are coupled together by a comb connection part at least partially formed from metal.

The first comb teeth may be aligned with a cutting direction of the hair cutting appliance, e.g. the direction in which the hair cutting appliance is moved by the user to cut hair.

The first comb teeth may be spaced laterally across the comb, e.g. in a direction perpendicular to a cutting direction of the hair cutting appliance. The comb teeth may be formed from the plastics material.

The comb connection part may comprise one or more metal elements at least partially covered, e.g. overmoulded, with a plastics material. The comb connection part may comprise a plurality of metal elements.

The first and/or second comb parts may be moulded over at least part of the connecting portion. In other words, the first and/or second parts may be formed by an over moulding process in which the first and/or second comb parts are moulded over the comb connection part.

The comb connection part may comprise a plurality of connection comb teeth aligned with the first comb teeth. Additionally or alternatively, the second comb part may comprise a plurality of second comb teeth aligned with the first comb teeth. The first and second comb teeth may be connected together by the connection comb teeth. In other words, each of the first comb teeth may be connected to a corresponding second comb tooth by a connection comb tooth.

The connection comb teeth may be formed by the one or more metal elements of the comb connection part. Metal elements may form a respective one of the connection comb teeth. In other words, each of the metal elements may form a respective connection comb tooth. Alternatively, a single one of the metal elements may form a plurality of the connection comb teeth, e.g. a single metal element may form each of the connection comb teeth.

One or more of the connection comb teeth may be free of metal, e.g. made entirely of the plastic material. For example, the connection comb teeth connecting together the lateral-most first and second comb teeth e.g. on either side of the comb, may be formed from the plastics material, e.g. free from metal.

The comb connection part may define a comb surface, which is to be held against a user's skin in use of the hair cutting appliance, the skin contact surface. In a preferred embodiment the second comb part may be configured to couple to the hair cutting appliance such that the cutting blades of the hair cutting appliance are aligned with the comb surface in the cutting direction. In an alternative embodiment the first comb part may be configured to couple the comb to the hair cutting appliance. The comb may be configured to adjust the position of the hair cutting appliance relative to the comb surface in order to enable a length of hair cut by the cutting appliance to be adjusted.

The comb may be configured such that, when the comb is coupled to the hair cutting appliance, the metal part of the comb connection part is aligned with a cutting blade of the hair cutting apparatus, more specifically at the cutting location, e.g. in the cutting direction.

The comb part may comprise a cutting length adjustor configured to adjust a distance between the coupling component and the comb connection part. Alternatively, the hair cutting appliance to which the comb is connected during use may have a comb adjustment unit, as is well known in the field of electrical hair clipping, the comb adjustment unit being arranged to move the comb with respect to the electrical hair clipper such that the cutting length varies.

At least a portion of the first comb teeth may extend away from the comb connection part, e.g. to distal ends of the first comb teeth, in a direction with a component perpendicular to the cutting direction, e.g. in a direction with a component perpendicular to the skin contact surface of the comb.

The first comb part may comprises a connecting bar. The connecting bar may be coupled to distal ends of one or more of the first comb teeth, e.g. the ends of the first comb teeth furthest from the comb connection part. The connecting bar may extend, e.g. continuously, between the distal ends of the first comb teeth. The connecting bar may connect together distal ends of two or more the first comb teeth.

A hair clearance may be provided between distal ends of one or more others of the first comb teeth and the connecting bar, to allow cut hair to pass over the comb teeth at the hair clearance. In other words, one or more comb teeth may not be coupled to the connecting bar. The one or more comb teeth not coupled to the connecting bar may be provided between comb teeth that are coupled to the connecting bar.

The hair clearance may extend in a direction with a component perpendicular to the cutting direction, e.g. a direction with a component perpendicular to the comb surface. The hair clearance may extend in the direction in which the first comb teeth extend, e.g. at the distal ends of the first comb teeth.

The connecting bar may be coupled to one of the comb teeth at each lateral side of the comb. The comb teeth arranged between the comb teeth at lateral sides of the comb may not be coupled to the connecting bar. The hair clearance may be provided between the distal ends of the teeth not coupled to the connecting bar and the connecting bar.

A thickness of the comb connection part may be less than 3 mm, e.g. approximately 1 mm or less than 1 mm, such as approximately 0.7 mm. In particular, the thickness of the portion of the comb connection part aligned within the cutting blades of the hair cutting apparatus, when the comb is coupled to the hair cutting apparatus, may have the above-mentioned thickness.

At least a portion of the connecting portion may be free from overmoulded plastic.

A hair cutting system may comprise the comb of any of the preceding claims and the hair cutting appliance.

A cutting blade of the hair cutting appliance, more specifically the hair cutting location formed by the cutting blades of the hair cutting appliance, may be aligned with the comb connection part of the comb, e.g. in a cutting direction of the hair cutting appliance, when the hair cutting appliance is coupled to the comb. The cutting blade of the hair cutting appliance may be aligned with the part of the comb connection part formed from metal.

A distance between the cutting blade of the hair cutting appliance and the comb connection part may adjustable, e.g. in a direction perpendicular to the cutting direction, in order to adjust the length of hair after being cut by the hair cutting system.

For example, the hair cutting appliance may be positionable relative to the comb connection part such that a length of hair after being cut by the hair cutting system is less than 3 mm, such as approximately 1 mm. In order words, the hair cutting appliance may be coupled to the comb such that a cutting plane defined by the hair cutting appliance is less than 3 mm from a comb surface of the comb connection part, which is placed against the users skin when cutting hair. A distance between a distal end of the hair cutting appliance and the cutting blade may be approximately 0.3 mm.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present invention, and to show more clearly how it may be carried into effect, reference will now be made, by way of example, to the accompanying drawings, in the drawings.

DETAILED DESCRIPTION

Figure 1:
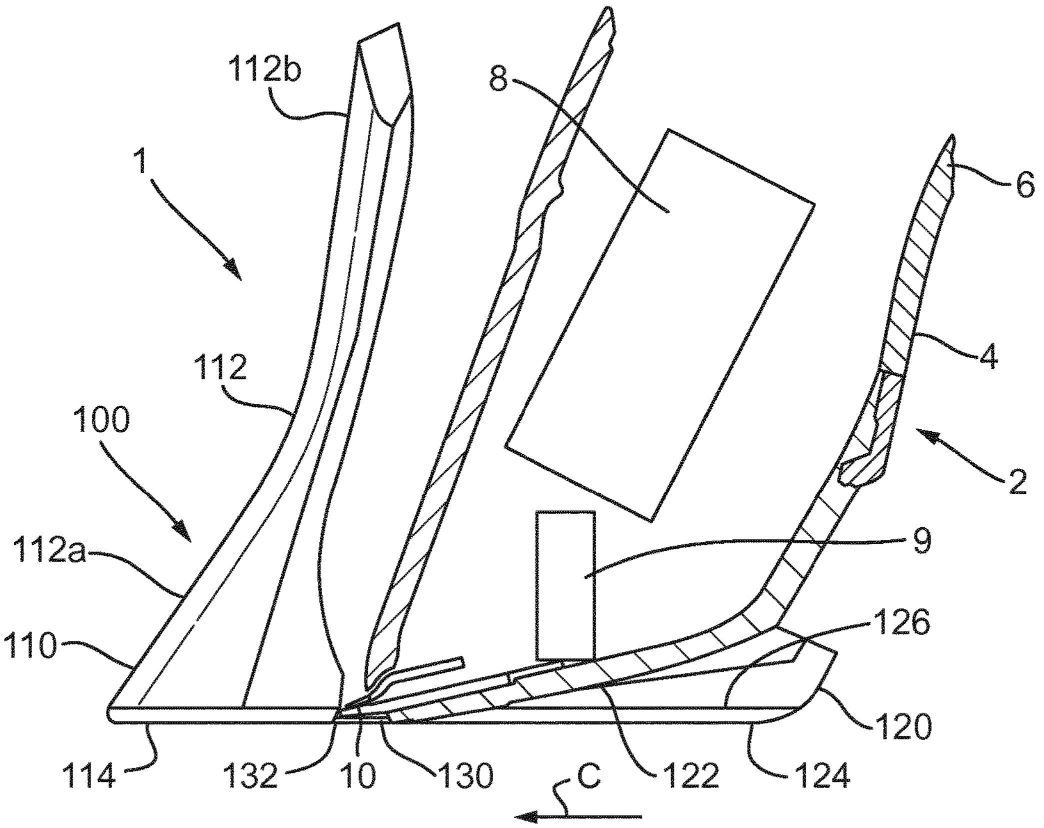
FIG. 1 is a partial sectional view of a hair cutting system according to the present disclosure.
Figure 2:
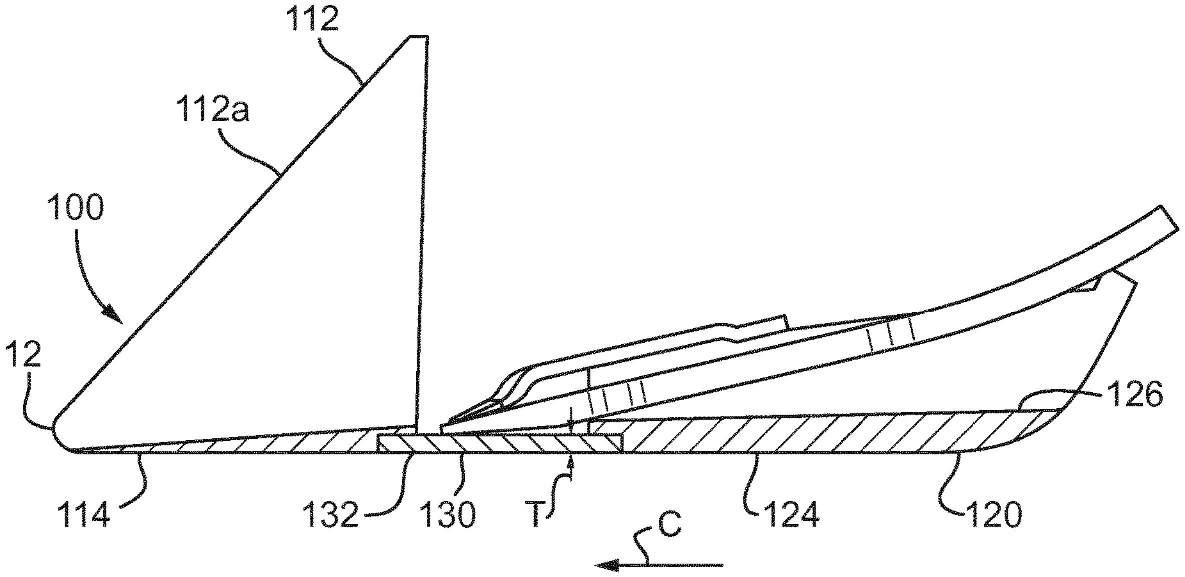
FIG. 2 is a partial, sectional, detail view of the hair cutting system.

With reference to FIGS. 1 and 2, a hair cutting system 1, according to arrangements of the present disclosure, comprises a hair cutting appliance 2 and a comb 100.

The hair cutting appliance 2 comprises a body 4 including a grip portion 6 configured to be held by user when the hair cutting system is in use. The hair cutting appliance 2 comprises one or more cutting blades 10, which may protrude from the body 4 of the hair cutting appliance for cutting hair.

The hair cutting appliance 2 further comprises an electric motor 8. The electric motor 8 drives the cutting blades 10, e.g. to perform a reciprocating, oscillating or rotating motion, in order to cut hair.

The comb 100 comprises a first comb part 110, a second comb part 120 and a comb connection part 130, which connects the first and second comb parts 110, 120 together. The comb connection part 130 defines a comb surface 132.

In some embodiments the comb surface might be formed by the skin facing side of the connection comb teeth 136. In use of the hair cutting system 2, the comb surface 132 is rested against the user's skin and the hair cutting system 2 is moved in a cutting direction C to cut the user's hair. It is to be noted that the comb surface 132 may be the only skin contact surface of the comb. Alternatively the skin contact surface might be formed by the connection comb teeth 136 and at least part of the second comb teeth 126 and/or the first comb teeth 112. More generally the skin contact surface might be formed by the comb connection portion 130, or by a combination of the comb connection portion and at least part of the second comb part 120 and/or the first comb part 110.

The first comb part 110 comprises a plurality of first comb teeth 112, which are arranged to guide hair towards the cutting blades 10 to be cut. The first comb teeth 112 each extend in the cutting direction C and are spaced laterally across the first comb part 120, e.g. in a direction perpendicular to the cutting direction C, in order to guide the hair towards the cutting blades across the lateral width of the hair cutting appliance 2.

The first comb teeth 112 may comprise respective ramp portions 112*a* that are arranged to lift hair away from the skin in order to position the hair in an appropriate position and orientation to be cut by the cutting blades 10. The first comb teeth 112 may further comprise respective extension portions 112*b* to continue supporting the hair after it has been lifted away from the skin, e.g. whilst it is being cut. The extension portions extend away from the comb surface 132 in a direction with a component perpendicular to the cutting direction C and the comb surface 132.

The first comb part 110, e.g. surfaces of the first comb teeth 112, defines a first comb surface 124, which forms a forward extension to the comb surface 132, e.g. forward of the cutting blades 10 in the cutting direction C.

The second comb part 120 comprises a coupling portion 122 configured to couple the comb 100 to the hair cutting appliance 2. The second comb part 120 defines a second comb surface 124 which forms a rearward extension to the comb surface 132, e.g. rearward of the cutting blades 10 in the cutting direction C.

The second comb part 120 may comprises a plurality of second comb teeth 126. The second comb teeth may be aligned, e.g. substantially aligned, with the first comb teeth 112, so that the second comb teeth 126 are arranged to continue guiding hair from the first comb teeth 112 past the cutting blades 10, as the hair cutting system 2 is moved in the cutting direction C.

The comb connection part 130 may comprise a plurality of protrusions or ribs extending in the cutting direction C to form a plurality of third comb teeth 132. The third comb teeth may be aligned, e.g. substantially aligned, with the first and second comb teeth, so that the third comb teeth 132 are arranged to guide hair from the first comb teeth 122 towards the cutting blades 10 and the second comb teeth 126. In some arrangements, the comb connection part 130 may be discontinuous in a lateral direction of the hair cutting system, e.g. perpendicular to the cutting direction C, to form the plurality of third comb teeth 132.

Figure 3:
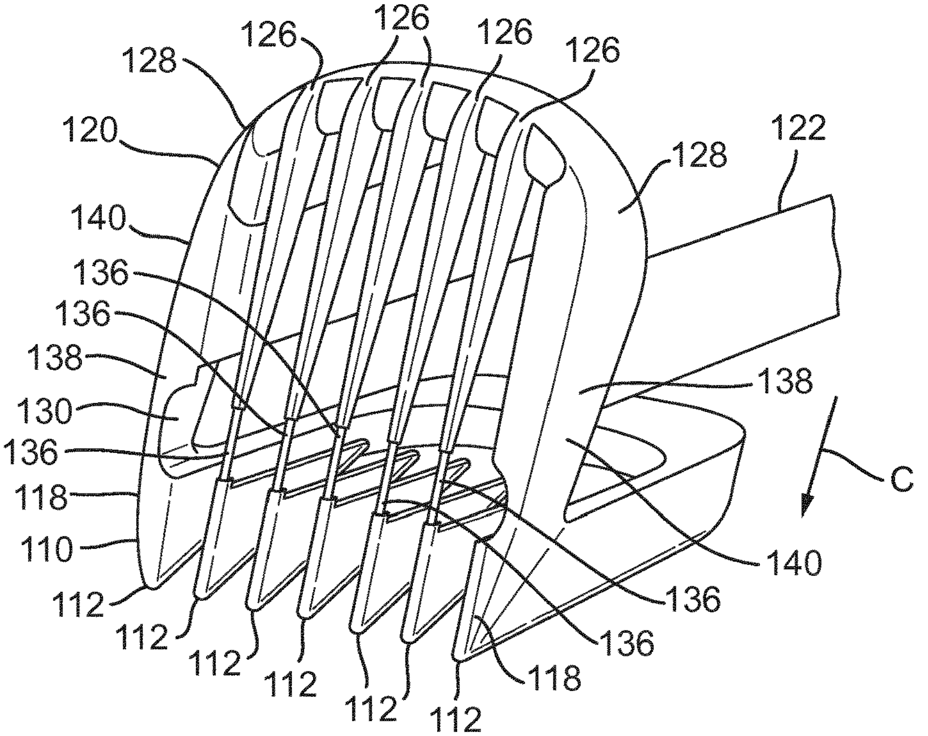
FIG. 3 is a perspective bottom view of a comb for the hair cutting system.

With reference to FIG. 3, the comb connection part 130 may comprise one or more comb connecting elements 136 arranged to couple together the first and second comb teeth 112, 126. The comb connection part 130 may be one-piece, e.g. comprising a single comb connecting element 136. Alternatively, as depicted in FIG. 3, the comb connection part 130 may comprise a plurality of comb connecting elements 136. The comb connecting elements 136 may correspond to the first and second comb teeth 112, 126, e.g. each of the comb connecting elements 136 may couple respective, corresponding first and second teeth together. The comb connection part 130 may consist of the comb connecting elements 136.

As depicted, the comb 100 comprises side walls 140 provided on lateral sides of the comb 100. The side walls 140 are formed by side wall parts, 118, 128, 138 of the first comb part 110, the second comb part 120 and the comb connection part 130 respectively. As depicted in FIG. 3, the side wall parts 118, 128, 138 may be formed integrally with one another, e.g. moulded together. The side walls 140 may form the lateral-most comb teeth of the comb 100, e.g. of the first, second and third comb teeth 112,126, 132.

As depicted in FIGS. 1 and 2, the cutting blades 10 are aligned with the comb connection part 130, e.g. in the cutting direction C. In particular, an area of the cutting blades in which hair reaching the cutting blades is cut, may be aligned with the comb surface 132 of the comb connection part 130 in the cutting direction C. The hair cutting system 2 is thereby configured so that the length of hair that has been cut by the hair cutting system 2 is approximately equal to the distance between the comb surface 132 of the comb connection part 130 and the cutting blades 10.

The second comb part 120, e.g. the coupling portion 122, and/or or the hair cutting appliance 2 may be configured such that the position of the hair cutting appliance 2 relative to the comb connection part 130 is adjustable in order to adjust the distance between the cutting blades 10 and the comb surface 132. In the arrangement depicted, the hair cutting appliance 2 comprises a cutting height adjustment mechanism 9 that adjusts the position of the hair cutting appliance 2 relative to the coupling portion 122, e.g. by changing the position on the coupling portion 122 at which the hair cutting appliance is coupled, in order to change the distance between the cutting blades 10 and the comb surface 132.

Additionally or alternatively, the hair cutting appliance 2 may be configured such that the position of the cutting blades 10 is movable relative to the body 4 of hair cutting apparatus 2 so that the distance between the cutting blades 10 and the comb surface 132 can be adjusted, e.g. without the body 4 of the hair cutting apparatus 2 being moved relative to the comb connection part 130.

The first comb part 110 and/or the second comb part 120 may be at least partially formed from a plastic material. In particular, the first comb teeth 122 may be formed from the plastic material. Additionally or alternatively, a portion of the first comb part forming the first comb surface 114 and/or the portion of the second comb parts forming the second comb surface 124 may be formed from the plastics material.

In other words, parts of the first and second comb parts that contact the skin and/or hair of the user during use of the hair cutting system 1 may be formed from the plastics material.

Forming the first and second comb parts 110, 120 at least partially from the plastics material may improve user comfort when using the hair cutting system 1. In some arrangements, the first and second comb parts 110, 120 may be formed entirely of the plastics material.

The comb connection part 130 may be at least partially formed from metal, such as aluminium, steel, stainless steel or titanium or a combination of different metals. In particular, a portion of the comb connection part 130 aligned with the cutting blades 10, e.g. in the cutting direction C, may be formed from metal.

By forming the comb connection part 130 at least partially from metal, the structural strength of the comb connection part 130 may be increased for a given thickness of the comb connection part, compared to a comb connection part made from the plastic material. The comb connection part 130 can therefore be made thinner without reducing the strength of the comb connection part, e.g. compared to a comb comprising a comb connection part made from the plastics material.

The length of hair that has been cut by the hair cutting system depends on the distance between the comb surface and the cutting blade 10. By forming the connecting part 130 from metal, the minimum thickness of hair that can be cut by the hair cutting system can be reduced, because the cutting blades 10 can be positioned closer to the comb surface.

In the arrangement depicted in FIG. 2, a thickness T of the comb connection part 130 is less than 3 mm. For example, it may be less than or equal to 1 mm and greater than or equal to 0.7 mm. If the distance between the cutting blades 10 of the hair cutting appliance 2 and a distal end of the hair cutting appliance is approximately 0.3 mm, the hair cutting system 1 is able to cut hair to a length of approximately 1 mm.

Returning to FIG. 3, the comb connection part 130 may comprise one or more comb connecting elements 136 formed from metal. In some arrangements, the comb connection part 130 may consist of the comb connecting elements 136.

The first comb part 110 and/or the second comb part 120 may be formed on to the comb connection part 130, e.g. onto the comb connection elements 136. For example, the first and/or second comb parts 110, 120 may be overmoulded on to the comb connection part 130. Alternatively, the comb connection part 130, e.g. the comb connecting elements 136, may be inserted into the first and/or second comb parts, e.g. after the first and/or second comb parts have been formed. In this case, the comb connection part 130 may be adhered to the first and second comb parts 110, 120 or attached using any other suitable process.

The comb surface 132 may be substantially covered with the plastics material. Alternatively, at least a portion of the comb surface 132 may be free of plastics material, e.g. so that the thickness of the comb connection part 130, and hence, the length of cut hair, can be minimized.

In the arrangement depicted in FIG. 3, the side wall portion 138 of the comb connection part 130 is formed from the plastics material. However, in other arrangements, the side wall portion 138 could be at least partially formed from metal. For example, the side wall portion may comprise a metal element overmoulded with plastic, e.g. forming the side wall portions 118, 128 of the first and/or second comb parts 110, 120.

Figure 4:
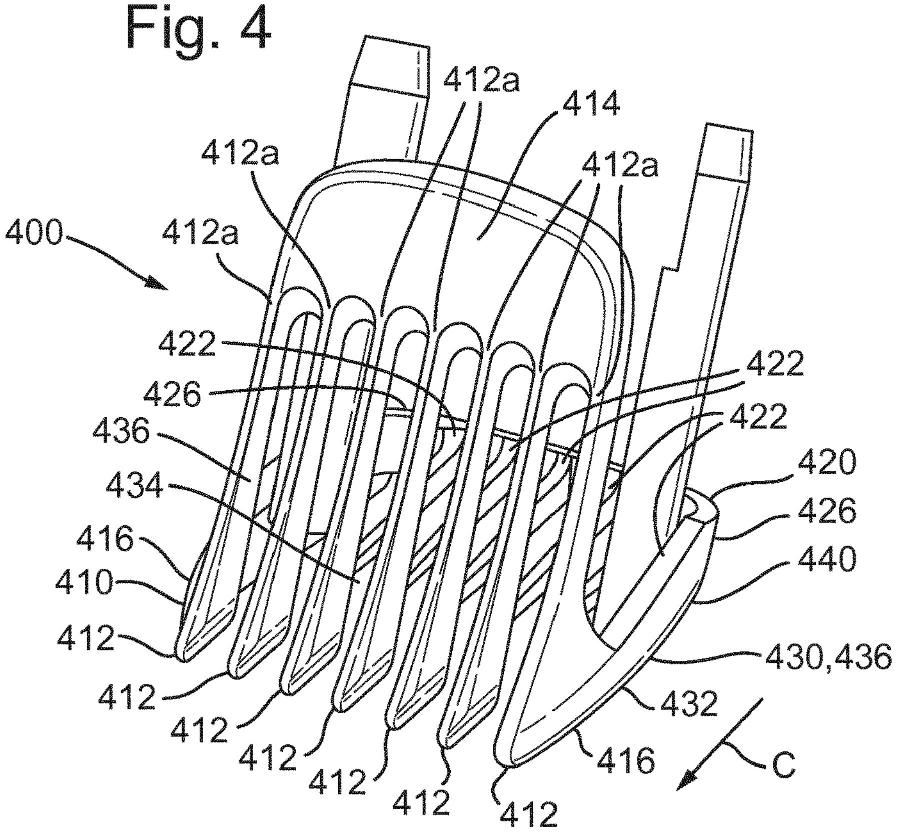
FIG. 4 is a perspective view of a previously proposed comb for a hair cutting appliance.

With reference to FIG. 4, a previously proposed comb 400 comprises a first comb part 410, a second comb part 420 and a comb connection part 430. The first comb part comprises a plurality of first comb teeth 412 and the second comb part 420 comprises a plurality of second comb teeth 422.

The comb connection part 430 consists of side wall portions 436 for forming part of a sidewall 440 of the previously proposed comb. The side wall 440 is similar to the sidewall 140 of the comb 100 depicted in FIG. 3 and is formed by side wall portions 416, 426, 436 of the first and second comb parts 410, 420 and the comb connection part 430.

The comb connection part 430 of the previously proposed comb 400 differs from the comb connection part 130 of the comb 100, in that the comb connection part 430 does not comprise comb connecting elements between the side wall portions 432. Instead, a gap 434 is provided in the cutting direction C between the first and second teeth 412, 422 in a central area of the comb 400. The gap 434 may be aligned with the cutting blades of a hair cutting appliance coupled to the comb 400.

In the previously proposed comb 400, having a gap 434 aligned with the cutting blades of the hair cutting appliance allows the cutting length of hair to be minimized, because the hair cutting appliance can be positioned at a comb surface 432 of the comb without clashing with the comb connection part 430.

As depicted, the first comb part 410 of the previously proposed comb 400 comprises a comb connecting bar 414. Because the first comb teeth 412 are not connected to the second comb teeth 422 by the comb connection part 430, each of the first comb teeth 412 is coupled to the comb connecting bar 414 at distal ends 412*a* of the first comb teeth. The comb connecting bar 414 thereby supports the first comb teeth 412 relative to the rest of the comb 400.

When the length of hair being cut by a hair cutting system comprising the previously proposed comb 400, exceeds a certain length, e.g. such that the hair being cut does not pass under the connecting bar 414, hair can stack up and become clogged between the first comb teeth 412 underneath the connecting bar 414.

Figure 5:
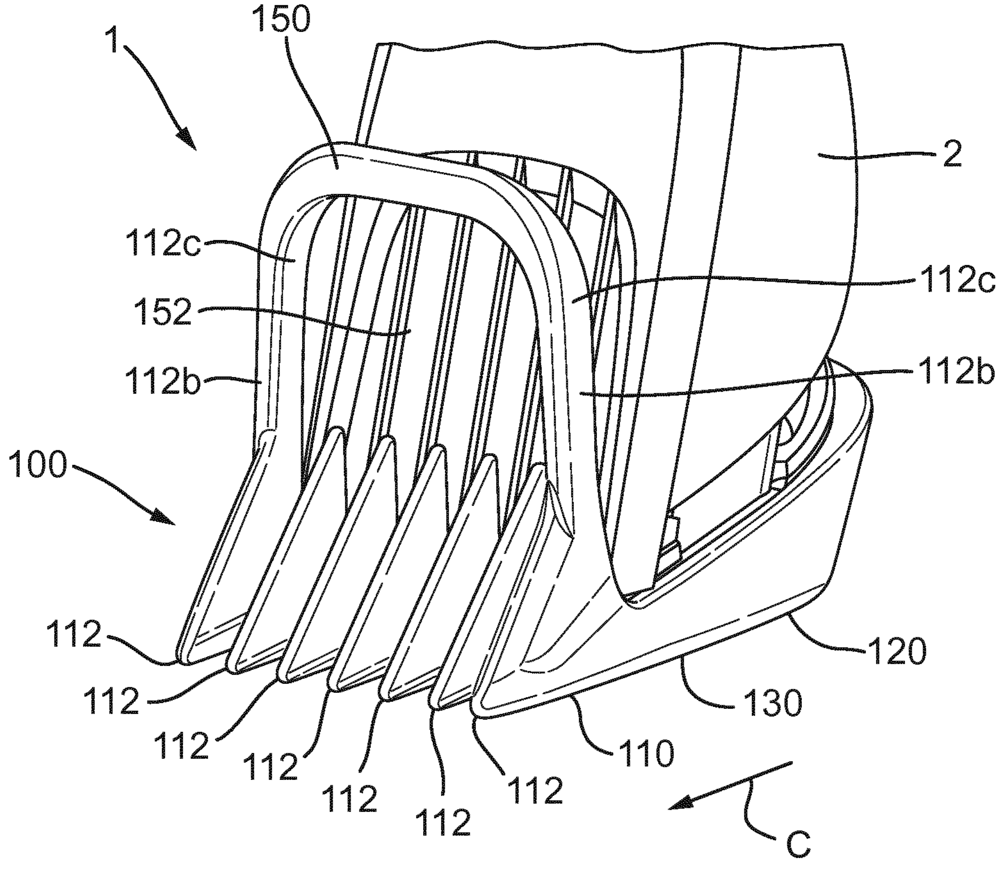
FIG. 5 is a perspective view of the hair cutting system according to the present disclosure.

With reference to FIG. 5, the comb 100 according to arrangement of the present disclosure comprises a comb connecting bar 150 extending laterally across the comb 100. One or more of the first comb teeth 112 are coupled to the comb connecting bar, e.g. at distal ends 112*c* of the first comb teeth. The distal ends of the first comb teeth are the ends furthest from the comb connection part 130, e.g. the ends of the extension portions 112*b* of the first comb teeth.

In the arrangement shown, the comb connecting bar 150 is coupled to distal ends of the first comb teeth formed by the side wall portions 118 of the first comb part 110. However, in other arrangements, different ones of the first comb teeth 112 may be connected to the comb connecting bar 150.

The comb teeth arranged between the side wall portions 118 may not be coupled to the comb connecting bar 150. Distal ends of the first comb teeth not connected to the comb connecting bar 150 may be spaced apart from the comb connecting bar 150, such that a hair clearance 152 is provided between the distal ends of the first comb teeth and the comb connecting bar 150.

As shown, the hair clearance 152 may extend in a direction with a component perpendicular to the cutting direction C of the hair cutting appliance 2. The hair clearance may extend in the direction in which the first comb teeth extend, e.g. the direction in which the extension portions 112*b* of the first comb teeth extend at their distal ends 112*c*.

Providing the hair clearance 152 between the first comb teeth 112 and the comb connection bar 150 allows hair that has been cut by the hair cutting appliance 2 to fall out of the comb 100 because it is not confined between the first comb teeth 112 and the comb connecting bar 150.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

The invention claimed is:

1. A comb configured for coupling to a hair cutting appliance, the hair cutting appliance comprising a cutting blade, the comb having a hair guiding direction, the comb comprising:

a comb connection part connecting a first comb part and a second comb part, wherein the first comb part comprises a plurality of first comb teeth, at least a portion of the plurality of first comb teeth extending in a direction perpendicular to the hair guiding direction, the first comb teeth being arranged, during use when the comb is coupled to the hair cutting appliance, to guide hair toward the hair cutting appliance for cutting;

and the second comb part comprises a plurality of second comb teeth aligned with the first comb teeth, wherein the first and second comb teeth are connected together by connection comb teeth of the comb connection part, wherein the first comb teeth and the second comb teeth are at least partially formed from a plastics material, wherein a central portion of each of the connection comb teeth, located between the first comb teeth and the second comb teeth, is formed from metal, and wherein the comb is configured such that, when the comb is coupled to the hair cutting appliance, the metal central portion of the comb connection teeth is positioned to substantially align with the cutting blade of the hair cutting appliance at a point along both the hair guiding direction and the direction perpendicular to the hair guiding direction; and wherein, during use of the comb when the comb is coupled to the hair cutting appliance, the first comb teeth precede the connection comb teeth and the second comb teeth trail the connection comb teeth when viewed in the hair guiding direction.

2. The comb of claim 1, wherein the second comb part further comprises a coupling portion for coupling the comb to the hair cutting appliance.

3. The comb of claim 1, wherein the connection comb teeth are at least partially covered with a plastics material.

4. The comb of claim 1, wherein the first and/or second comb parts are moulded over at least part of the connection comb teeth.

5. The comb of claim 1, wherein a thickness of the connection comb teeth in the direction perpendicular to the hair guiding direction is less than 3 mm when the comb is in use.

6. The comb of claim 1, wherein the comb connection part comprises at least one metal element at least partially covered with a plastic material.

7. A hair cutting system comprising the comb of claim 1 and the hair cutting appliance.

8. The hair cutting system of claim 7, wherein a distance between the cutting blade of the hair cutting appliance and the comb connection part is adjustable in order to adjust the length of hair after being cut by the hair cutting system.

* * * * *